(12) United States Patent
Perazzi et al.

(10) Patent No.: US 11,281,970 B2
(45) Date of Patent: Mar. 22, 2022

(54) KERNEL PREDICTION WITH KERNEL DICTIONARY IN IMAGE DENOISING

(71) Applicant: Adobe Inc., San Jose, CA (US)

(72) Inventors: Federico Perazzi, San Francisco, CA (US); Zhihao Xia, St. Louis, MO (US); Michael Gharbi, San Francisco, CA (US); Kalyan Sunkavalli, San Jose, CA (US)

(73) Assignee: Adobe Inc., San Jose, CA (US)

( * ) Notice: Subject to any disclaimer, the term of this patent is extended or adjusted under 35 U.S.C. 154(b) by 207 days.

(21) Appl. No.: 16/686,978

(22) Filed: Nov. 18, 2019

(65) Prior Publication Data

US 2021/0150333 A1    May 20, 2021

(51) Int. Cl.
*G06K 9/62* (2006.01)
*G06N 3/08* (2006.01)
*G06T 15/50* (2011.01)
*G06T 5/00* (2006.01)
*G06N 20/10* (2019.01)

(52) U.S. Cl.
CPC .............. *G06N 3/08* (2013.01); *G06N 20/10* (2019.01); *G06T 5/002* (2013.01); *G06T 15/50* (2013.01)

(58) Field of Classification Search
CPC .......... G06N 3/08; G06N 20/10; G06T 15/50; G06T 5/002; G06T 2207/20081; G06T 2207/20084
USPC ................................ 382/156, 264, 275, 299
See application file for complete search history.

(56) References Cited

U.S. PATENT DOCUMENTS

| 2011/0097011 A1* | 4/2011 | Lim ........................ G06T 11/60 382/264 |
| 2020/0285883 A1* | 9/2020 | Hiasa ...................... G06T 5/002 |

\* cited by examiner

*Primary Examiner* — Charlotte M Baker
(74) *Attorney, Agent, or Firm* — Kilpatrick Townsend & Stockton LLP

(57) ABSTRACT

Certain embodiments involve techniques for efficiently estimating denoising kernels for generating denoised images. For instance, a neural network receives a noisy reference image to denoise. The neural network uses a kernel dictionary of base kernels and generates a coefficient vector for each pixel in the reference image such that the coefficient vector includes a coefficient value for each base kernel in the kernel dictionary, where the base kernels are combined to generate a denoising kernel and each coefficient value indicates a contribution of a given base kernel to a denoising kernel. The neural network calculates the denoising kernel for a given pixel by applying the coefficient vector for that pixel to the kernel dictionary. The neural network applies each denoising kernel to the respective pixel to generate a denoised output image.

20 Claims, 8 Drawing Sheets

KERNEL PREDICTION WITH KERNEL DICTIONARY IN IMAGE DENOISING

TECHNICAL FIELD

This disclosure relates generally to computer-implemented methods and systems for digital video processing. Specifically, the present disclosure involves generating denoising kernels for denoising an image.

BACKGROUND

Image creation and editing applications are used to generate and/or edit images that may be created or captured by any means, including images that are photographs, computer generated, screen captures, or the like. The image editing applications generate photorealistic images by rendering the image, which is the process of generating a realistic image from a model using a scene file. Typically, a scene file describes the image (e.g., texture, lighting, shading, and the like), and the scene is rendered based on the model and the scene file. Rendering techniques include rendering algorithms within the models that attempt to address the interaction of light with objects within the image, referred to as light transport modelling. The depiction of light within the image increases the realism of content depicted in the image.

Existing techniques for rendering an image include, for example, ray tracing using Monte Carlo methods. Monte Carlo methods are a type of computational algorithm that uses repeated random sampling to make numerical estimations of unknown information. The number of samples used dictates the quality of the estimation. Accordingly, when used for image rendering, lower sampling can generate a low-quality (e.g., noisy and/or low-resolution) rendering. Monte Carlo rendering is widely used, but to generate a high-quality, realistic output is time consuming and processor intensive. When fewer samples are used, the image rendering of the low-quality rendering is faster than using many samples to generate a high-quality Monte Carlo rendering, however, the rendering is of insufficient quality for use. Recent techniques include generating a low-quality Monte Carlo rendering and denoising the low-quality rendering using denoising kernels. To denoise the low-quality rendering, denoising kernels for respective pixels of the image are generated. To generate a denoised image rendering, the denoising kernels are applied to their respective pixels. The prior techniques for generating denoising kernels for each pixel, however, are themselves very processor intensive and time consuming.

BRIEF SUMMARY

Certain embodiments involve techniques for using kernel dictionaries to generate denoising kernels for denoising noisy image renderings. In one embodiment, an image editing system receives an image that may be input to a neural network for denoising. The neural network estimates coefficient vectors for each of the pixels of the image, such that each pixel has an associated coefficient vector. The computer system applies the coefficient vectors to a kernel dictionary to generate denoising kernels, respectively, such that each pixel has an associated denoising kernel. The neural network generates a denoised image by applying each denoising kernel to a respective pixel of the image that is associated with the denoising kernel. The neural network outputs the denoised image. Embodiments of this aspect include corresponding computer systems, apparatus, and computer programs recorded on one or more computer storage devices, each configured to perform the actions of the techniques.

In additional or alternative embodiments, the kernel dictionary includes base kernels, and the coefficient vector for each pixel includes a vector of percentages. In these embodiments, generating a particular denoising kernel for a particular pixel includes weighting each base kernel with a respective percentage from a particular coefficient vector and combining the weighted base kernels into the particular denoising kernel. Optionally, the base kernels are fixed values. Optionally, the kernel dictionary and the neural network are trained using a ground truth image. Optionally, the kernel dictionary is generated by a kernel estimator layer of the neural network based on the image for denoising. The kernel estimator layer receives and analyzes the image and generates the base kernels based on analyzing the image. Optionally, the computer system generates the image using Monte Carlo rendering. Implementations of the described techniques may include hardware, a method or process, or computer software on a computer-accessible medium.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
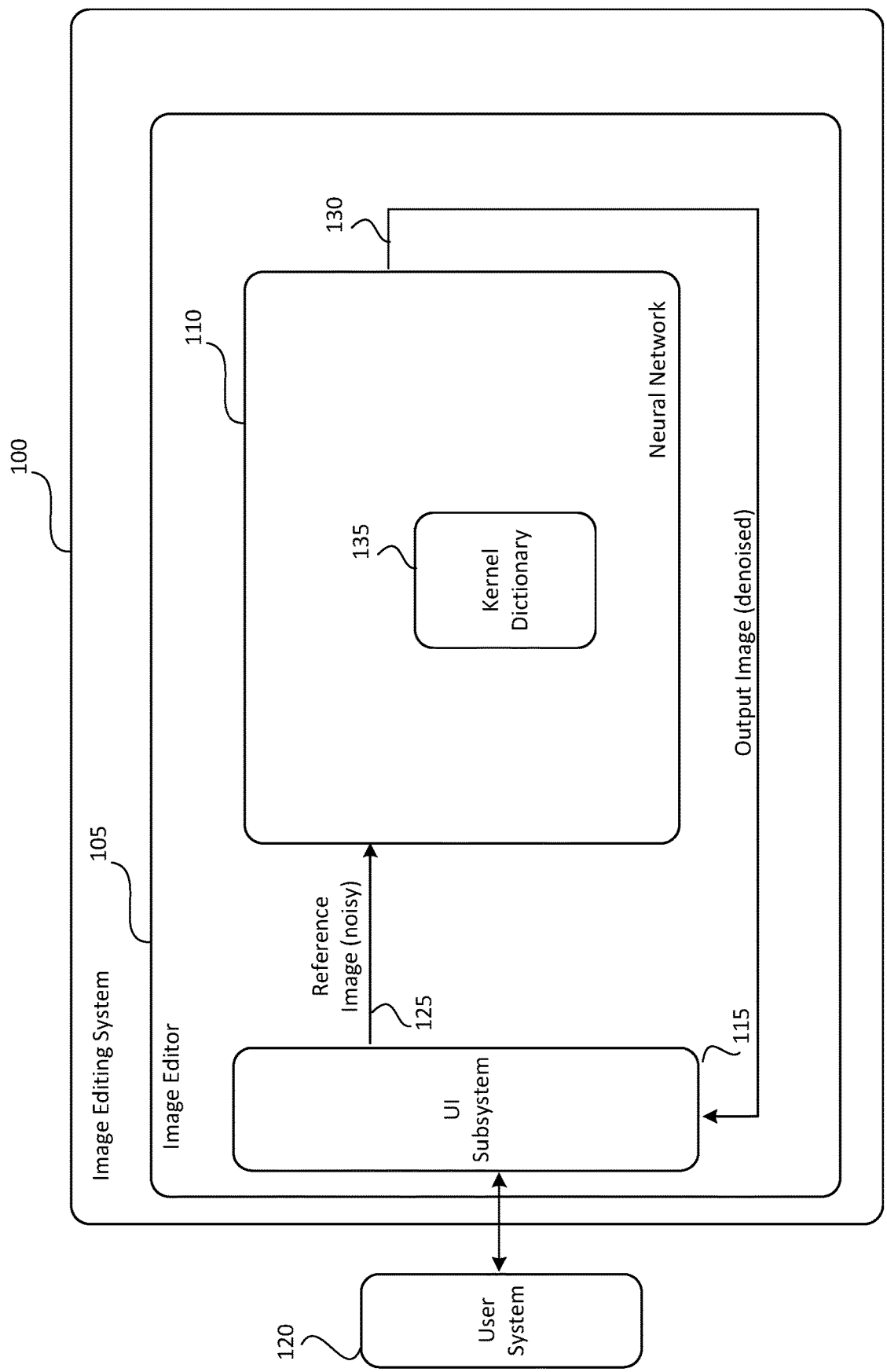
FIG. 1 depicts an example of an image editing system for estimating denoising kernels for rendering images, according to certain embodiments.

The present disclosure involves performing or otherwise facilitating efficient image rendering by generation of denoising kernels efficiently for denoising a noisy rendering of an image. As discussed above, existing rendering techniques for generating photorealistic image renderings may use Monte Carlo methods. In particular, recent techniques include generating a low-quality Monte Carlo rendering and denoising the low-quality rendering using denoising kernels. These techniques, however, can present disadvantages. For instance, while generating the low-quality Monte Carlo rendering is relatively fast and may not be resource intensive (e.g., consuming large amounts of memory, large numbers of processing cycles, etc.), the process of generating a denoising kernel for each pixel is often time consuming and resource intensive. For example, the denoising kernel for each pixel is typically a vector or matrix of hundreds of numbers. Denoising kernels are predicted, respectively, for large numbers of pixels (e.g., typically thousands in an image). Thus, the denoising process is prohibitively slow. Alternative methods may replace kernel prediction with direct regression of clean images, but direct regression has poor denoising results. Thus, depicting light accurately in an image using Monte Carlo renderings decreases the utility of image editing tools by requiring extensive resources. This is a challenge for users because the equipment and time necessary for obtaining quality renderings is expensive. The embodiments described herein increase the efficiency of rendering an image by using kernel dictionaries to generate the denoising kernels.

The following non-limiting example is provided to introduce certain embodiments. In this example, an image processing system (e.g., a computer system executing image editing or creation software) may generate a noisy image rendering, such as a Monte Carlo rendering. The image processing system provides the noisy image as an input to a neural network. The neural network generates, using the noisy image, coefficient vectors for respective pixels of the noisy image. The neural network also references a kernel dictionary. The kernel dictionary is a set of base kernels that are used with the coefficient vectors to generate the denoising kernel for each pixel. Specifically, a coefficient vector for a pixel includes a respective value for base kernels in the kernel dictionary, where a given value in the coefficient vector indicates a percentage of a corresponding base kernel that should be included in the denoising kernel for that pixel. For example, if the kernel dictionary includes ten base kernels, the coefficient vector that the neural network generates will be a ten-value vector, where each value corresponds to one of the ten base kernels. For example, the first value in the coefficient vector may be 0.2, which indicates that twenty percent of the denoising kernel is from the first base kernel. The remaining values in the coefficient vector can be associated with the remaining base kernels. The values in the coefficient vector can be multiplied by corresponding base kernels and the products can be added together to create a denoising kernel for a given pixel. These denoising kernels can be applied to their respective pixels to generate the denoised image. The neural network can output the denoised image, and the image may be displayed to the user.

Embodiments described herein provide improvements over existing denoising techniques for digital images. For instance, a process for rendering a digital image can be more efficient (e.g., performed more quickly, performed using fewer processing resources, etc.) by using a kernel dictionary to generate denoising kernels. As one example, denoising involves computing denoising kernels for hundreds or thousands of pixels in an image. Since a denoising kernel is a matrix of several hundred numbers (e.g., a 21×21 matrix is 441 numbers, which is a typical size for a denoising kernel), predicting denoising kernels for hundreds or thousands of pixels involves estimating hundreds of thousands of values to generate a denoising kernel for each pixel. Using the neural network to predict or estimate a value is more resource intensive (e.g., computationally expensive) than a straightforward mathematical calculation such as multiplication or addition. In the embodiments described herein, the kernel dictionary is used to limit the number of predicted values needed, and straightforward mathematical calculations are used to generate the denoising kernels. In other words, rather than estimating hundreds of values in a denoising kernel for each pixel, embodiments, such as the example above, estimate a smaller value (e.g., ten-value) coefficient vector for each pixel. Then, straightforward mathematical calculations (i.e., computationally cheaper calculations) are used to multiply the coefficient vectors by the corresponding base kernels and add the products to generate denoising kernels for each pixel. As a result, the techniques described herein are substantially faster and computationally cheaper than previous techniques.

Referring to the drawings, FIG. 1 illustrates an example of an image editing system 100 that may be used to efficiently generate a high-quality image renderings. Image editing system 100 may be any suitable computing system such as, for example, computing device 800 of FIG. 8 or server computer 705 of FIG. 7 in cloud computing environment 700. Image editing system 100 may be separate from user system 120, or may be incorporated into a single user system 120. Stated differently, image editing system 100 may be an application on a user system 120 or accessed remotely by user system 120. User system 120 may be any suitable computing device such as, for example, computing device 800 of FIG. 8. A user can utilize user system 120 to edit and create images and specifically efficiently generate high-quality image renderings as described in more detail herein.

Image editing system 100 includes an image editor 105. Image editing system 100 may include other components, such as, for example, memory, a processor, and the like. However, the other components are omitted from FIG. 1 for simplicity of illustration and description. Image editor 105 may be a software application used to create and edit images. The image editor 105 includes a user interface (UI) subsystem 115 that allows the user accessing user system 120 to interface with the image editor 105. The UI subsystem 115 provides a graphical user interface to the user for creating and editing images with the image editor 105.

Figure 2:
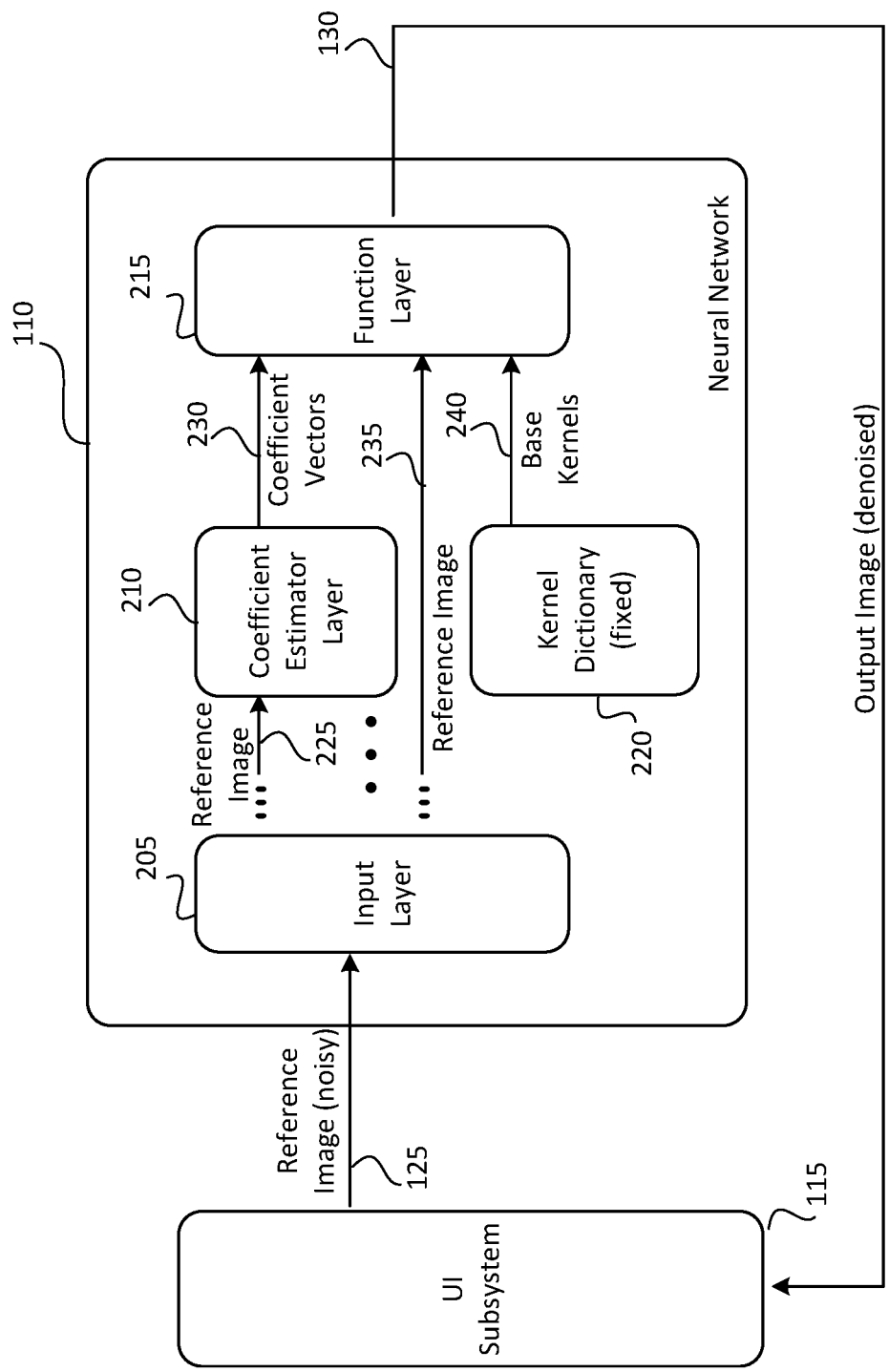
FIG. 2 depicts an example of the neural network portion of the image editing system for estimating denoising kernels using a fixed kernel dictionary, according to certain embodiments.
Figure 3:
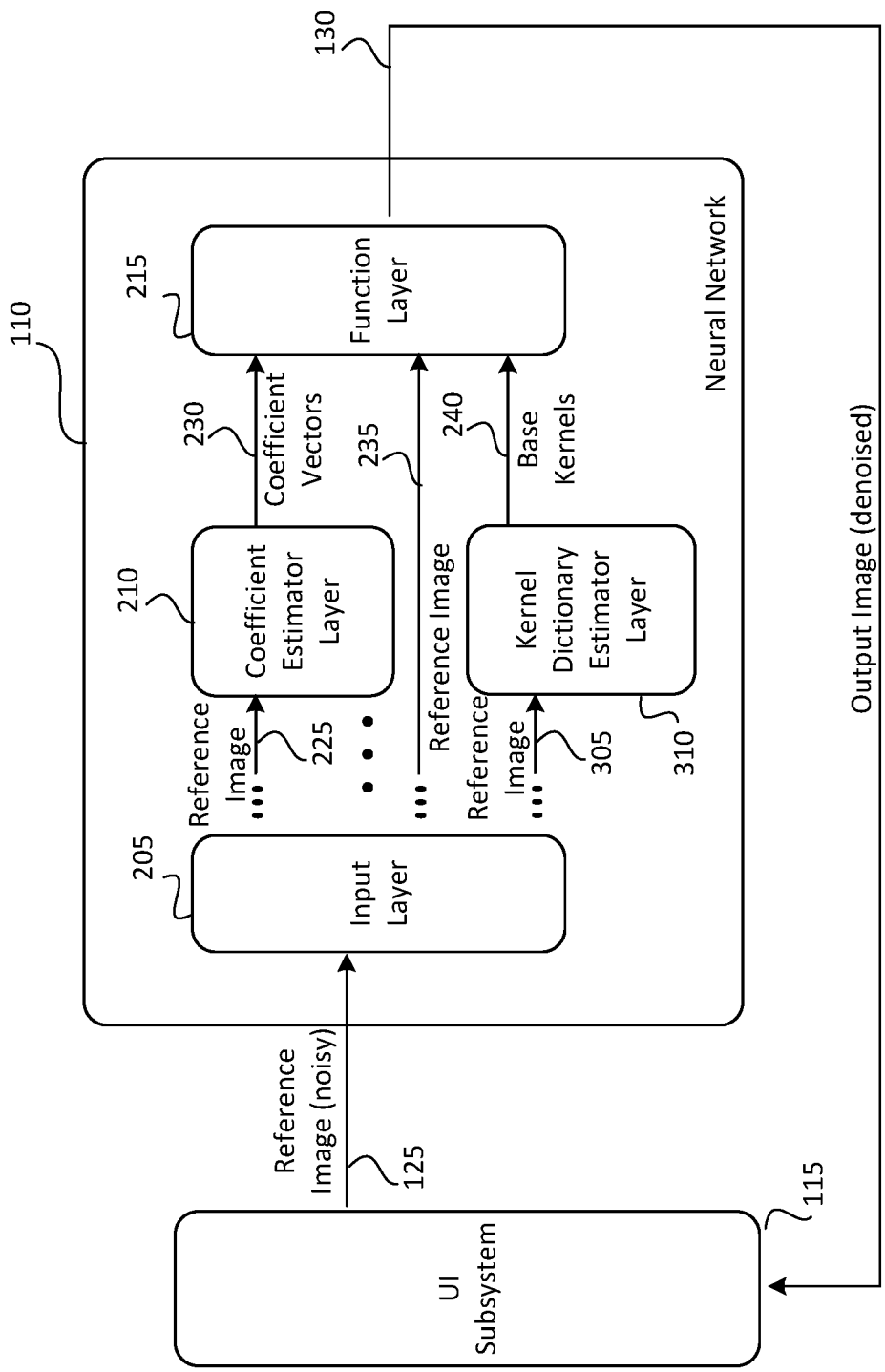
FIG. 3 depicts an example of the neural network portion of the image editing system for estimating denoising kernels using a kernel dictionary estimator, according to certain embodiments.

Image editor 105 further includes neural network 110. In some embodiments, though depicted herein within the image editor 105, neural network 110 may be within the same computer system (e.g., computing device 800 as described with respect to FIG. 8) as image editor 105, or may be on a separate or remote computing system including, for example, a cloud computing system, that is in communication with image editing system 100 such that the inputs to neural network 110 can be transmitted across a network from the image editor 105 and the outputs of neural network 110 can be transmitted back across the network to the image editor 105. The neural network 110 receives a reference image as input from the UI subsystem. The reference image is noisy as shown by arrow 125. The neural network 110 includes a kernel dictionary 135. The kernel dictionary 135 contains base kernels that are used to generate a denoising kernel for respective pixels of the reference image. The kernel dictionary 135 may include a fixed set of base kernels as described in more detail with respect to FIG. 2, or the kernel dictionary 135 may generate the base kernels based on the reference image as described in more detail with respect to FIG. 3. The neural network 110 uses the kernel dictionary 135 to generate and output a denoised output image as shown by arrow 130. The reference image may be any image that has been rendered such that the reference image is noisy. The reference image may be rendered by image editor 105, may be received from user system 120, or may be received from any other source. The purpose of neural network 110, as described in more detail in FIGS. 2 and 3, is to denoise the reference image such that the output image is a high-quality rendering that is provided to the UI subsystem 115 and can then be provided to user system 120 for display to the user. The output image may also be stored in storage on the user system 120 or image editing system 100. For example, the output image may be stored in program data 817 of memory 810 of FIG. 8.

FIG. 2 depicts an example of a neural network 110 in an embodiment in which the kernel dictionary 220 is fixed. Neural network 110 includes input layer 205, coefficient estimator layer 210, function layer 215, and kernel dictionary 220. Neural network 110 may include additional layers. However, these additional layers are omitted from FIG. 2 for simplicity of illustration and description. The functionality of neural network 110 may be incorporated into more or fewer layers without departing from the scope of this disclosure.

Input layer 205 receives the reference image as shown by arrow 225. The reference image is a noisy image that can be denoised using denoising kernels. For example, the reference image may be a low-quality Monte Carlo rendering. The input layer 205 provides the reference image to the coefficient estimator layer 210 as shown by arrow 225, and to the function layer 215, as shown by arrow 235.

The kernel dictionary 220 contains the base kernels. Base kernels in kernel dictionary in FIG. 2 are fixed base kernels that were generated based on training during the training of the neural network 110. There may be any number (e.g., 10, 50, 100) of base kernels in the kernel dictionary 220. The base kernels are each a matrix of numbers. The base kernels are all the same size matrix and can be any size (e.g., 10×10, 10×20, 21×21, or so forth). The base kernels are a collection of kernels from which the denoising kernel is generated for each pixel, respectively. A denoising kernel for a pixel is generated, in this example, by combining percentages of the base kernels into the denoising kernel.

Coefficient estimator layer 210 receives and analyzes the noisy reference image. The coefficient estimator layer 210 is pre-trained to generate a coefficient vector for each pixel of the reference image based on the base kernels in kernel dictionary 220. The coefficient estimator layer 210 generates a coefficient vector for each pixel of the reference image where the coefficient vector includes a value for each of the base kernels. Each value in the coefficient vector is a percentage associated with one of the base kernels in kernel dictionary 220. The percentage associated with the base kernel is a weighting used to generate the denoising kernel for the respective pixel. The output of the coefficient estimator layer 210 is a number of coefficient vectors such that there is one coefficient vector for each pixel of the noisy reference image. Each coefficient vector has at least the same number of elements as there are base kernels in the kernel dictionary 220. Stated differently, each base kernel in the kernel dictionary 220 has a corresponding value in an element of a coefficient vector. The kernel dictionary is generated based on features of the image, and the coefficient vectors are generated to increase or decrease the relevance of those features in the final output image. Example features that may be emphasized or deemphasized based on the kernel dictionary include quantity of noise on the object surface (variance) of the object of interest in the image, texture of the object, depth (distance of the object from the camera), quantity of light hitting the object surface, type of material (e.g., roughness specularity, transparency).

Kernel dictionary 220 provides the base kernels to the function layer 215 as shown by arrow 240. Coefficient estimator layer 210 provides the coefficient vectors to the function layer 215 as shown by arrow 230. Input layer 205 provides the reference image to the function layer 215 as shown by arrow 235. Function layer 215 calculates the denoising kernel for each pixel of the reference image by combining the percentage of each base kernel from the kernel dictionary based on the pixel's associated coefficient vector. For example, the first pixel has an associated coefficient vector that indicates a percentage of each base kernel to combine to generate the denoising kernel for the first pixel. The function layer 215 combines the indicated percentages of each base kernel to generate the denoising kernel for the first pixel. The function layer 215 generates the denoising kernel for each pixel. The function layer 215 then applies the denoising kernel to each associated pixel to generate a denoised output image. More specifically, applying the denoising kernel to each associated pixel generates pixels with reduced noise that more closely match surrounding pixels in the noisy image to create a noise-free or reduced noise image. The function layer 215 outputs the output image (denoised image) to the UI subsystem 115 as shown by arrow 130. Returning to FIG. 1, the UI subsystem 115 may then display the output image to the user system 120.

The neural network 110 predicts a coefficient vector each having a number of values based on the number of base kernels in the kernel dictionary for each pixel. As an example, the kernel dictionary may include fifty kernels, each kernel may be a 21×21 matrix, and an image to be denoised may include 2000 pixels. A 21×21 matrix includes 441 values. Thus, if each denoising kernel is computed anew for each pixel without using a kernel dictionary, such a computation involves estimating 882,000 values (i.e., 441 elements in the denoising kernel matrix multiplied by 2000 pixels). By contrast, using the embodiment depicted in FIG. 2, neural network 110 can predict a denoising kernel for each pixel by estimating a coefficient vector for each of the pixels. To predict a denoising kernel for each pixel using the kernel dictionary, the neural network 110 estimates 100,000 values (i.e., 50 coefficient values multiplied by 2000 pixels). Neural network 110, in that scenario, predicts 782,000 fewer values than systems that lack a kernel dictionary. In this example, using a modern computer, it would take the computer approximately 1 second to estimate the 100,000 values and approximately 10 seconds to predict the additional 882,000 values, making the system that uses a kernel dictionary approximately ten times faster.

FIG. 3 illustrates an alternative embodiment of neural network 110 in which the kernel dictionary is not fixed. In the embodiment shown in FIG. 3, rather than a fixed kernel dictionary 220, the neural network 110 includes a kernel dictionary estimator layer 310. In this embodiment, the UI subsystem 115 provides the reference image to input layer 205 as indicated by arrow 125. The input layer provides the reference image to the coefficient estimator layer 210 as shown by arrow 225, the function layer 215 as shown by arrow 235, and the kernel dictionary estimator layer 310 as shown by arrow 305.

The kernel dictionary estimator layer 310 analyzes the reference image. The kernel dictionary estimator layer 310 is pre-trained to generate the base kernels in the kernel dictionary based on the reference image. The kernel dictionary estimator layer 310 generates base kernels based on features of interest to enhance or improve including, for example, quantity of noise on the object surface (variance) of the object of interest in the image, texture of the object, depth (distance of the object from the camera), quantity of light hitting the object surface, type of material (e.g., roughness specularity, transparency). The generated base kernels in the kernel dictionary are each a matrix of values from which a percentage is taken to generate the denoising kernel for each pixel. The base kernels may be any size (e.g., 10×10, 5×10, 21×21) where each base kernel is the same size (i.e., has the same number of values) as the others in the kernel dictionary. The size of the kernels can be based on the amount of noise in the reference image. For example, a larger kernel is used for a noisier image (e.g., 95×95 for a very noisy reference image, and 5×5 for a reference image with very little noise visible). In addition, the size of the kernel may be based on the resolution of the reference image. For example, a 20×20 kernel on a 1K×1K reference image will cover the same neighboring area of a 40×40 kernel on a 2K×2K image. There may be any number of base kernels generated (e.g., 10, 100, 128). As the kernel size increases, fewer kernels in the kernel dictionary may be used. For example, a kernel dictionary with 95×95 kernels may include 10 kernels, while a kernel dictionary with 5×5 kernels may include 100 kernels. The kernel dictionary estimator layer 310 provides the base kernels to the function layer 215 as shown by arrow 240.

Coefficient estimator layer analyzes the noisy reference image in view of the base kernels generated by kernel dictionary estimator layer 310. The coefficient estimator layer 210 is pre-trained to generate a coefficient vector for each pixel of the reference image based on the base kernels in kernel dictionary generated by the kernel dictionary estimator layer 310. The coefficient estimator layer 210 generates a coefficient vector for each pixel of the reference image where the coefficient vector includes a value for each of the base kernels. Each value in the coefficient vector is a percentage associated with one of the base kernels in the estimated kernel dictionary. The percentage associated with the base kernel is a weighting used to generate the denoising kernel for the respective pixel. The output of the coefficient estimator layer 210 is a number of coefficient vectors such that there is one coefficient vector for each pixel of the noisy reference image. Each coefficient vector has at least the same number of elements as there are base kernels, each base kernel in the kernel dictionary has a corresponding value in an element of a coefficient vector.

Kernel dictionary estimator layer 310 provides the base kernels to the function layer 215 as shown by arrow 240. Coefficient estimator layer 210 provides the coefficient vectors to the function layer 215 as shown by arrow 230. Input layer 205 provides the reference image to the function layer 215 as shown by arrow 235. Function layer 215 calculates the denoising kernel for each pixel of the reference image by combining the percentage of each base kernel from the kernel dictionary based on the pixel's associated coefficient vector. Using the example in FIG. 2, the first pixel has an associated coefficient vector that indicates a percentage of each base kernel to combine to generate the denoising kernel for the first pixel. The function layer 215 combines the indicated percentages of each base kernel to generate the denoising kernel for the first pixel. The function layer 215 generates the denoising kernel for each pixel. The function layer 215 then applies the denoising kernel to each associated pixel to generate a denoised output image. The function layer 215 outputs the output image to the UI subsystem 115 as shown by arrow 130. Returning to FIG. 1, the UI subsystem 115 may then display the output image to the user system 120.

The neural network 110 in the embodiment of FIG. 3 predicts a coefficient vector each having a number of values based on the number of base kernels in the kernel dictionary for each pixel. The neural network 110 also predicts each value in each base kernel. As an example, the kernel dictionary may include 100 kernels, each kernel may be a 21×21 matrix, and an image to be denoised may include 2000 pixels. Thus, if each denoising kernel is computed anew for each pixel without using a kernel dictionary, such a computation involves estimating 882,000 values (i.e., 441 elements in the denoising kernel matrix multiplied by 2000 pixels). By contrast, using the embodiment depicted in FIG. 3, neural network 110 can predict a denoising kernel for each pixel by estimating a set of base kernels for the kernel dictionary and a coefficient vector for each pixel in the noisy image. To predict the base kernels neural network 110 estimates 44,100 values (i.e., 100 base kernels each having 441 values). To predict the denoising kernel for each pixel using the kernel dictionary, the neural network 110 estimates 200,000 values (i.e., 100 coefficient values multiplied by 2000 pixels). In that scenario, neural network 110 predicts 244,100 values to generate the kernel dictionary and the denoising kernels for respective pixels. Neural network 110, in that scenario, predicts 637,900 fewer values than systems that lack a kernel dictionary. Using a modern computer, estimating 837,900 values would take approximately 10 seconds, while estimating 200,000 values would take only about 1.5 seconds. Even greater gains would be seen with larger images.

Figure 4:
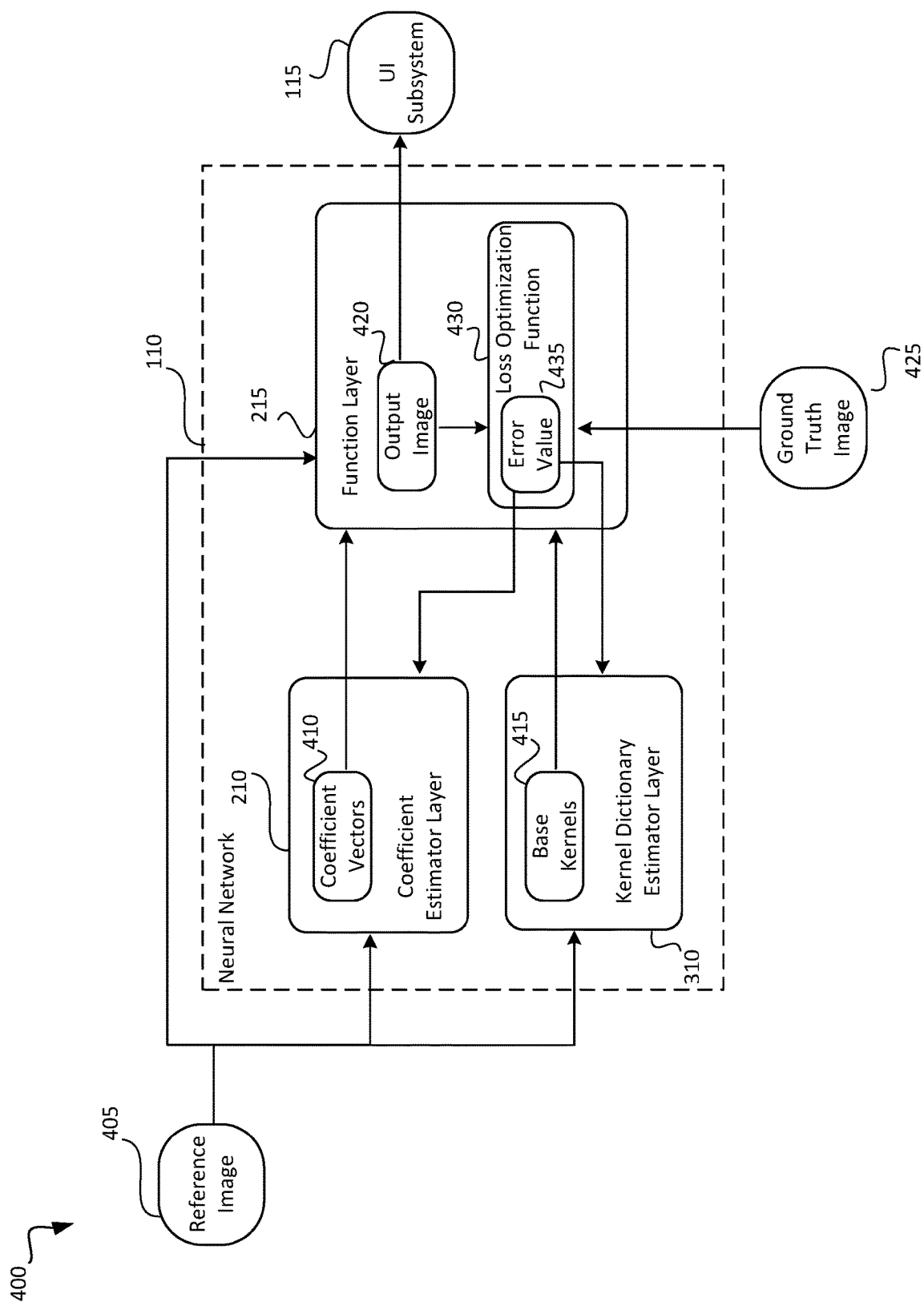
FIG. 4 depicts a simplified example of training a neural network depicted in FIGS. 1-3, according to certain embodiments.

FIG. 4 illustrates an example of a data flow 400 for training a neural network 110. In the training phase, reference image 405 is provided to coefficient estimator layer 210, kernel dictionary estimator layer 310, and function layer 215. Note that in embodiments in which the kernel dictionary is fixed (e.g., the embodiment shown in FIG. 2), the reference image may be provided to the kernel dictionary 220, and the kernel dictionary 220 is trained to have fixed values similarly to kernel dictionary estimator layer 310 being trained to generate base kernels for each reference image. The kernel dictionary estimator layer 310 generates the base kernels 415 as described above with respect to FIG. 3, or fixed base kernels 415 are used, as described above with respect to FIG. 2. The base kernels 415 are provided to function layer 215. The coefficient estimator layer 210 generates the coefficient vectors 410 as described above with respect to FIGS. 2 and 3. The coefficient vectors 410 are provided to the function layer 215. The function layer 215 uses the reference image, coefficient vectors 410, and base kernels 415 to generate the output image 420. More specifically, the function layer 215 calculates a denoising kernel for each pixel, respectively, by taking the percentage of each base kernel 415 based on the coefficient vector 410 for each associated pixel. The function layer 215 then applies the denoising kernel calculated for each respective pixel to the respective pixel to generate the output image 420. The output image 420 is sent to UI subsystem 115 and to loss optimization function 430. Loss optimization function 430 also receives the ground truth image 425. The loss optimization function 430 generates an error value 435 based on the differences between the output image 420 and the ground truth image 425. For example, a stochastic gradient function may be used to generate the error value 435.

The error value 435 is fed back into the coefficient estimator layer 210 and the kernel dictionary estimator layer 310. The amount of error indicated by error value 435 is used by coefficient estimator layer 210 and kernel dictionary estimator layer 310 to adjust the parameters and weights used to generate the coefficient vectors 410 and the base kernels 415. After performing training on many reference images 405, the neural network 110 becomes trained to consistently estimate the coefficient vectors 410 and base kernels 415 such that the output image 420 is substantially similar to the ground truth image 425. The trained neural network 110 may be deployed as described in FIGS. 2 and 3.

Figure 5:
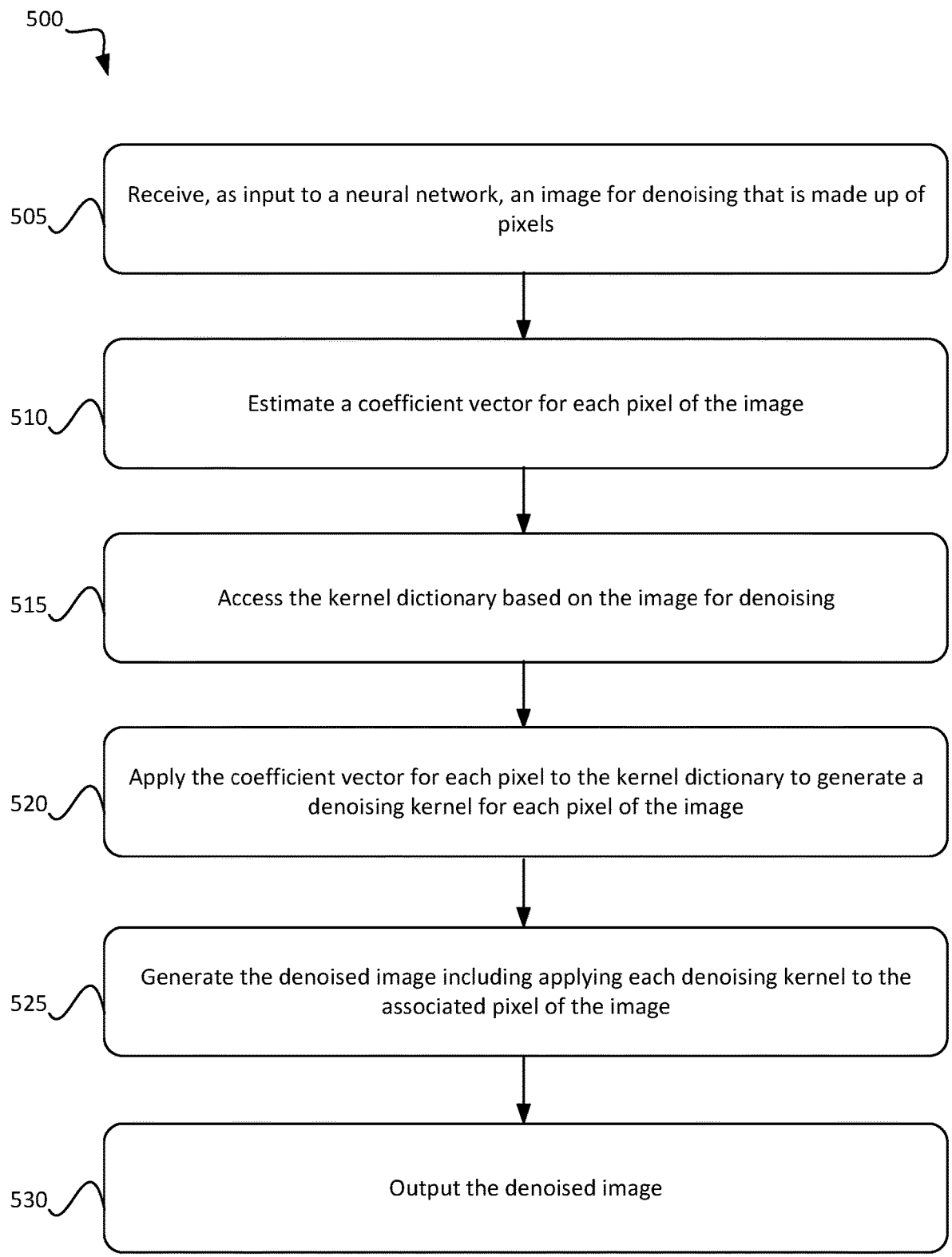
FIG. 5 depicts a process for using a kernel dictionary to estimate denoising kernels for rendering images, according to certain embodiments.

FIG. 5 illustrates a method 500 for efficiently generating a denoising kernel for each pixel in an image. The method 500 may be performed by image editing system 100 of FIG. 1 and more specifically by neural network 110 as described in embodiments in FIG. 2 or 3. While the steps appear in a specific order, one or more steps may be performed in a different order or simultaneously with other steps. Method 500 may begin at step 505 with receiving, as input to a neural network, an image for denoising that is made up of pixels. For example, UI subsystem 115 may receive the reference image from user system 120, or the UI subsystem may receive the reference image from the image editing system generating a low-quality Monte Carlo rendering as the reference image. The UI subsystem 115 may provide the reference image to input layer 205, which is input to the neural network 110.

At step 510, the system estimates a coefficient vector for each pixel of the image. For example, coefficient estimator layer 210 may generate a coefficient vector for each pixel of the image based on the base kernels in kernel dictionary 220 or the base kernels estimated by kernel dictionary estimator layer 310. The coefficient vector generated by coefficient estimator layer 210 will include a value for each base kernel for the associated pixel such that the value for each base kernel is the percentage of that base kernel that is to be used to generate the denoising kernel for that particular pixel. For an image having 5000 pixels, the coefficient estimator layer 210 will output 5000 coefficient vectors. For a kernel dictionary having 100 base kernels, each coefficient vector will be a 100-dimension coefficient vector.

At step 515, the system accesses a kernel dictionary. In some embodiments, the kernel dictionary accessed at step 515 is fixed, as described with respect to FIG. 2. In additional or alternative embodiments, the system generates a kernel dictionary based on the image for denoising. For example, kernel dictionary estimator layer 310 generates the kernel dictionary based on the reference image as described above with respect to FIG. 3. The kernel dictionary generated may include a predetermined number of base kernels each of a predetermined size. For example, the kernel dictionary estimator layer 310 may be trained to generate 100 base kernels each of size 21×21. In some embodiments, kernel dictionary estimator layer 310 is trained to generate a variable number of base kernels of a size that is determined based on the image to be denoised. For example, the kernel dictionary estimator layer 310 may generate for a first image a kernel dictionary of 50 base kernels each of size 30×30 and for a second image a kernel dictionary of 10 base kernels each of size 95×95. The kernel dictionary estimator layer 310 may select the size of the kernel based on how noisy the reference image is. For example, larger kernel sizes may be generated for very noisy images, and smaller kernel sizes may be generated for images with little noise. Further, the number of kernels generated may be based on the size of the kernels generated. When larger kernels are generated, fewer kernels may be generated (e.g., kernel dictionary of ten— 95×95 kernels vs. 100—5×5 kernels). In some embodiments, the size of each base kernel is not the same (e.g., one base kernel is 10×10 and a second base kernel is 20×20). In embodiments in which the kernel dictionary is generated, this generation may be performed before or simultaneously with step 510.

At step 520 the system applies the coefficient vector for each pixel to the kernel dictionary to generate a denoising kernel for each pixel of the image. For example, the function layer 215 can calculate the denoising kernel for each respective pixel based on the pixel's coefficient vector and the base kernels in the kernel dictionary. Each coefficient vector includes a value associated with each base kernel that indicates a percentage of that base kernel to include in the denoising kernel for the respective pixel. As an example, the function layer 215 can multiple the percentages in the coefficient vector by the corresponding base kernel and add the products to arrive at the denoising kernel for each respective pixel.

At step 525 the system generates the denoised image by applying denoising kernels to respective pixels in the image to be denoised. For example, function layer 215 may apply each denoising kernel to the respective pixel. Applying a denoising kernel to its respective pixel may include generating additional pixels to surround the existing pixel in the image to be denoised such that the additional pixels smooth and fill in the image to generate a high-quality image of the noisy image that was provided to the neural network to be denoised.

At step 530, the system outputs the denoised image. For example, the function layer 215 of the neural network 110 outputs the denoised output image. The output image is sent to the UI subsystem 115 and may be output to the user system 120 for viewing by the user. As previously discussed, user system 120 may be a remote system from the image editing system 100, or image editing system 100 may be, for example, a software application installed on user system 120.

Figure 6:
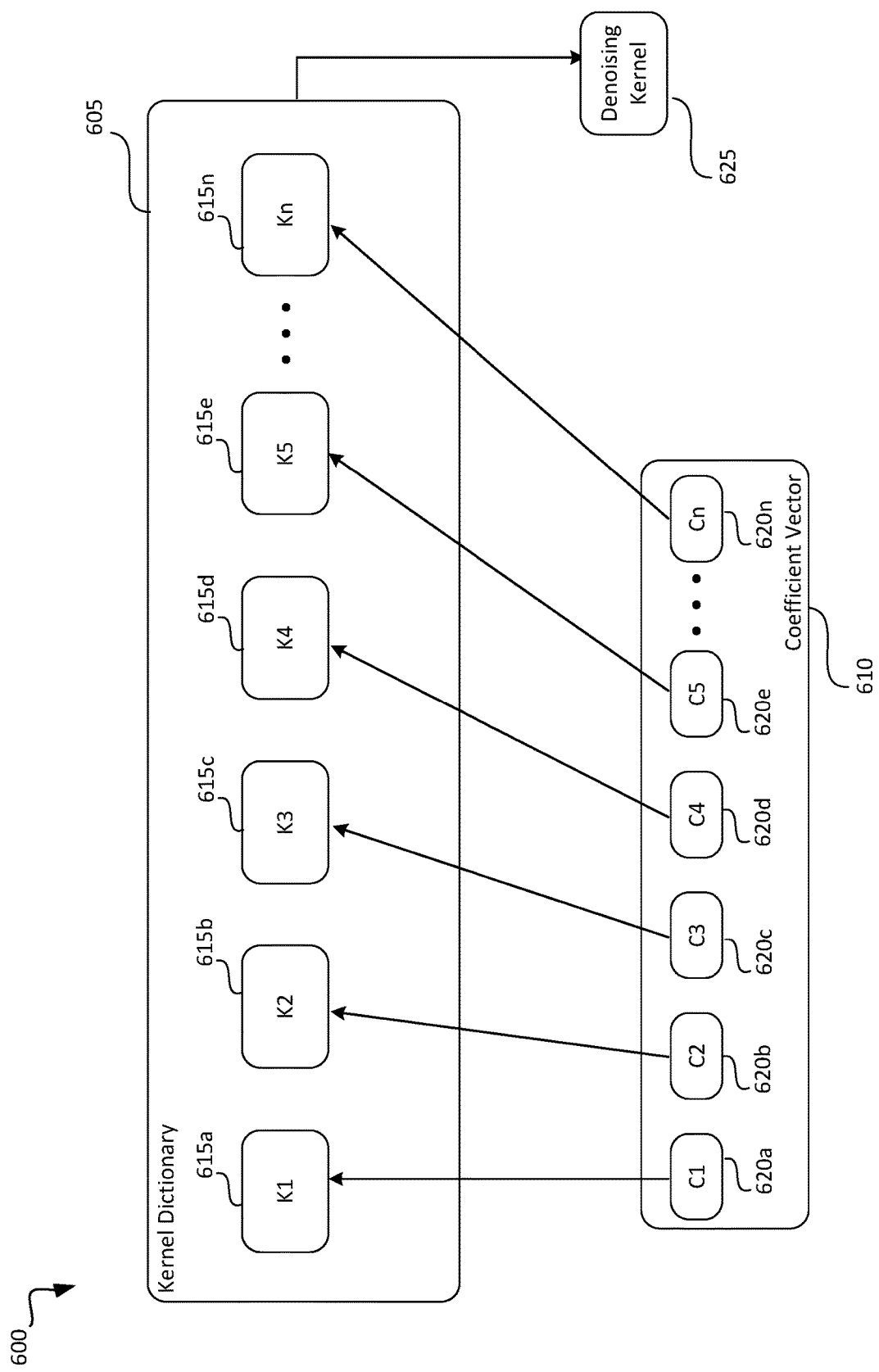
FIG. 6 depicts examples of a kernel dictionary and coefficient vector, according to certain embodiments.

FIG. 6 illustrates an example of a model 600 of a kernel dictionary 605 and corresponding coefficient vector 610. The kernel dictionary includes base kernels 615. There may be any number of base kernels 615. In the kernel dictionary 605, base kernels 615a, 615b, 615c, 615d, 615e, through 615n are depicted. The number of base kernels 615 may be predetermined and/or the size of each base kernel 615 may be predetermined. In some embodiments, the base kernels 615 are all the same size. In various embodiments, the kernel dictionary 605 is fixed, as described above with respect to the examples in FIG. 2, and/or generated for each image by the neural network as described above with respect to the examples in FIG. 3. The base kernels 615 in kernel dictionary 605 are used for each pixel in the reference image being denoised. Using the kernel dictionary for each pixel in an image provides substantial time and processor cost savings.

The coefficient vector 610 is an n-dimensional vector, where n is the number of base kernels 615 in the kernel dictionary 605. The coefficient vector 610 includes a coefficient value 620 for each base kernel 615 in the kernel dictionary 605. In this example, coefficient value 620a corresponds to base kernel 615a, coefficient value 620b corresponds to base kernel 615b, and so forth up to coefficient value 620n corresponds to base kernel 615n. The coefficient value 620 is a percentage of the base kernel 615 that is to be used to generate the denoising kernel 625. For example, the base kernel 615a is multiplied by the coefficient value 620a, the base kernel 615b is multiplied by the coefficient value 620b, and so forth through base kernel 615n is multiplied by the coefficient value 620n, and the products of each are added together to generate the denoising kernel 625.

As discussed above, a coefficient vector 610 is generated for each pixel of the reference image, so for example, for an image having three thousand (3000) pixels, three thousand (3000) coefficient vectors 610 are estimated by neural network 110 and specifically by coefficient estimator layer 210. Accordingly, after each coefficient vector 610 is applied to the kernel dictionary 605, three thousand (3000) denoising kernels 625 are generated.

Examples of Computing Environments for Implementing Certain Embodiments

Figure 7:
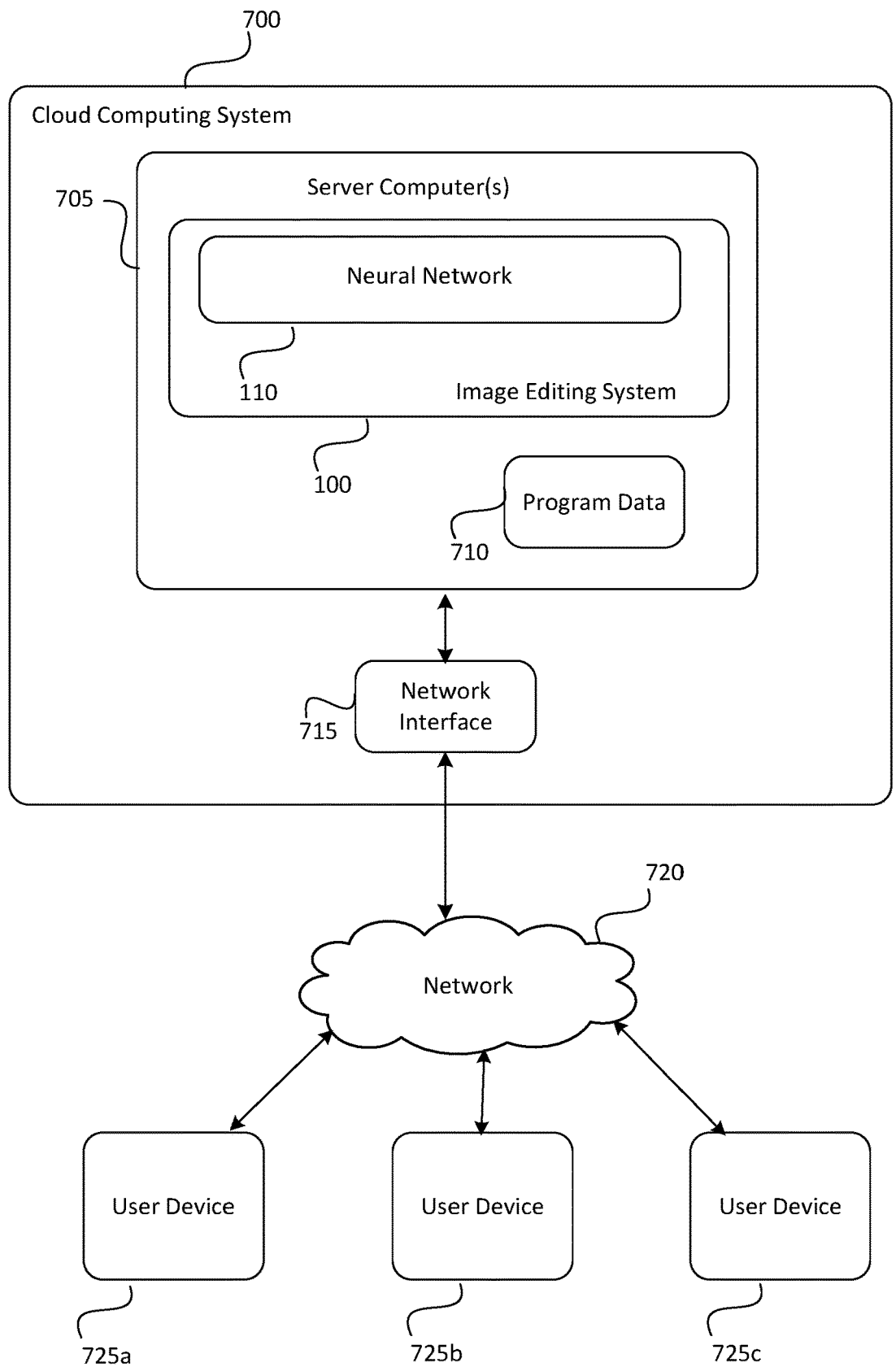
FIG. 7 depicts an example of a cloud computing system that may implement the image editing system, according to certain embodiments.
Figure 8:
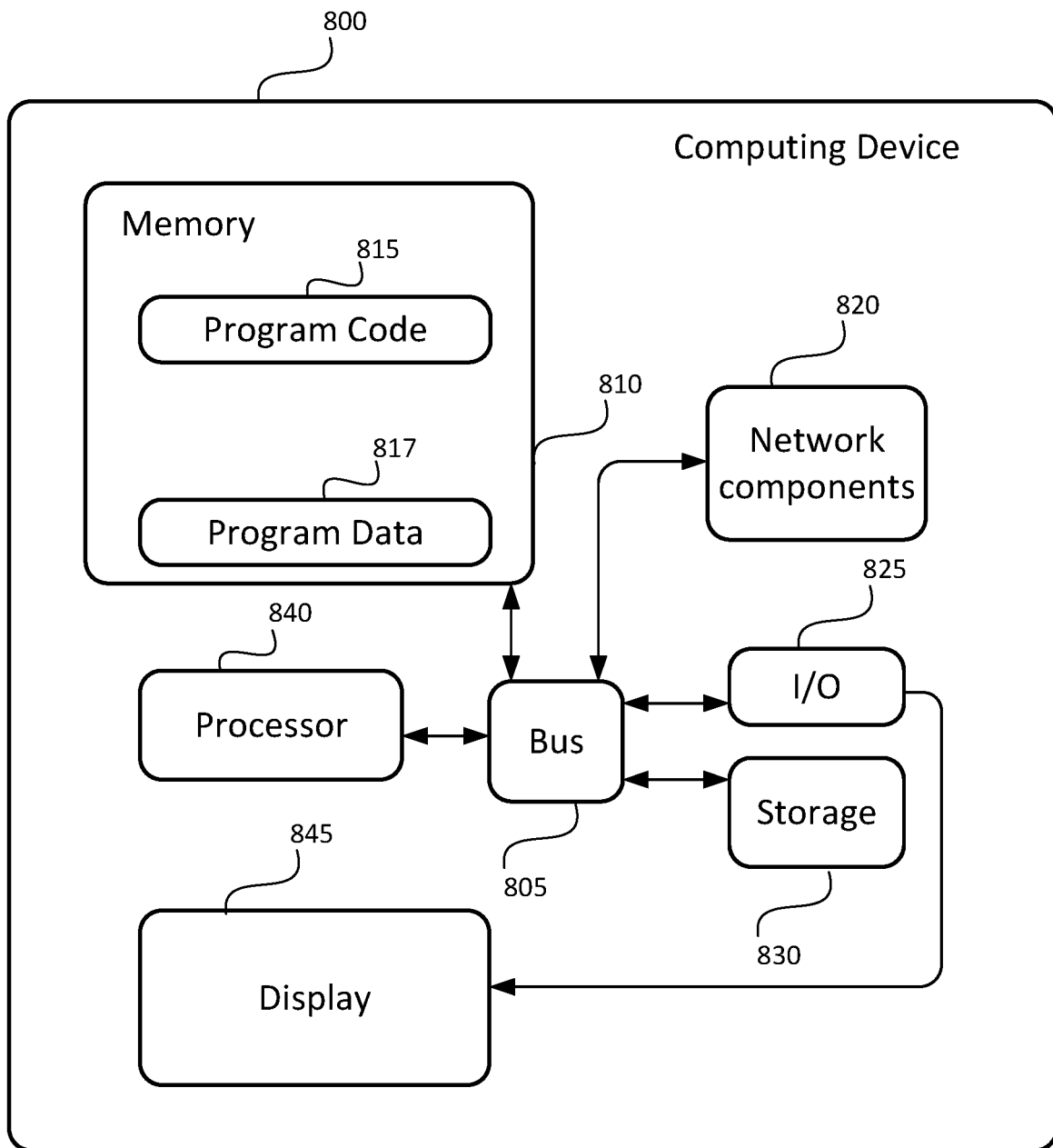
FIG. 8 depicts an example of a computing device that may implement the image editing system, according to certain embodiments.

Any suitable computing system or group of computing systems can be used for performing the operations described herein. For example, FIG. 7 illustrates a cloud computing system 700 by which at least a portion of the image editing system 100 may be offered. FIG. 8 depicts an example of a computing device 800 that may be at least a portion of image editing system 100. The implementation of the computing device 800 could be used for one or more of the image editor 105 or the user system 120. In an embodiment, a single image editing system 100 having devices similar to those depicted in FIG. 8 (e.g., a processor, a memory, etc.) combines the one or more operations and data stores depicted as separate subsystems in FIG. 1.

In some embodiments, the functionality provided by the image editing system 100 may be offered as cloud services by a cloud service provider. For example, FIG. 7 depicts an example of a cloud computing system 700 offering an image editing service that can be used by a number of user subscribers using user devices 725a, 725b, and 725c across a data network 720. User devices 725a, 725b, and 725c could be examples of a user subsystem 120 described above. In the example, the image editing service may be offered under a Software as a Service (SaaS) model. One or more users may subscribe to the image editing service, and the cloud computing system performs the processing to provide the image editing service to subscribers. The cloud computing system may include one or more remote server computers 705.

The remote server computers 705 include any suitable non-transitory computer-readable medium for storing program code (e.g., an image editing system 100) and program data 710, or both, which is used by the cloud computing system 700 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 705 can include volatile memory, non-volatile memory, or a combination thereof.

One or more of the servers 705 execute the program code 710 that configures one or more processors of the server computers 705 to perform one or more of the operations that provide image editing services, including the ability to utilize the neural network 110 to perform image editing. As depicted in the embodiment in FIG. 7, the one or more servers providing the services to perform image editing via the neural network 110 may include access to the layers of the neural network 110 including the function layer 215, the coefficient estimator layer 210, and the kernel dictionary estimator layer 310. Any other suitable systems or subsystems that perform one or more operations described herein (e.g., one or more development systems for configuring an interactive user interface) can also be implemented by the cloud computing system 700.

In certain embodiments, the cloud computing system 700 may implement the services by executing program code and/or using program data 710, which may be resident in a memory device of the server computers 705 or any suitable computer-readable medium and may be executed by the processors of the server computers 705 or any other suitable processor.

In some embodiments, the program data 710 includes one or more datasets and models described herein. Examples of these datasets include image data, new image content, image energy data, etc. In some embodiments, one or more of data sets, models, and functions are stored in the same memory device. In additional or alternative embodiments, one or more of the programs, data sets, models, and functions described herein are stored in different memory devices accessible via the data network 715.

The cloud computing system 700 also includes a network interface device 715 that enable communications to and from cloud computing system 700. In certain embodiments, the network interface device 715 includes any device or group of devices suitable for establishing a wired or wireless data connection to the data networks 720. Non-limiting examples of the network interface device 715 include an Ethernet network adapter, a modem, and/or the like. The image editing system 100 is able to communicate with the user devices 725a, 725b, and 725c via the data network 720 using the network interface device 715.

FIG. 8 illustrates a block diagram of an example of a computer system 800. Computer system 800 can be any of the described computers herein including, for example, image editor 105, user system 120, or server computer 705. The computing device 800 can be or include, for example, a laptop computer, desktop computer, tablet, server, or other electronic device.

The computing device 800 can include a processor 840 interfaced with other hardware via a bus 805. A memory 810, which can include any suitable tangible (and non-transitory) computer readable medium, such as RAM, ROM, EEPROM, or the like, can embody program components (e.g., program code 815) that configure operation of the computing device 800. Memory 810 can store the program code 815, program data 817, or both. In some examples, the computing device 800 can include input/output ("I/O") interface components 825 (e.g., for interfacing with a display 845, keyboard, mouse, and the like) and additional storage 830.

The computing device 800 executes program code 815 that configures the processor 840 to perform one or more of the operations described herein. Examples of the program code 815 include, in various embodiments, the neural network 110 including the coefficient estimator layer 210, the function layer 215, and the kernel dictionary estimator layer 310, or any other suitable systems or subsystems that perform one or more operations described herein (e.g., one or more development systems for configuring an interactive user interface). The program code 815 may be resident in the memory 810 or any suitable computer-readable medium and may be executed by the processor 840 or any other suitable processor.

The computing device 800 may generate or receive program data 817 by virtue of executing the program code 815. For example, reference image 405, ground truth image 425 and output image 420 are all examples of program data 817 that may be used by the computing device 800 during execution of the program code 815.

The computing device 800 can include network components 820. Network components 820 can represent one or more of any components that facilitate a network connection. In some examples, the network components 820 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 820 can be wired and can include interfaces such as Ethernet, USB, or IEEE 1394.

Although FIG. 8 depicts a single computing device 800 with a single processor 840, the system can include any number of computing devices 800 and any number of processors 840. For example, multiple computing devices 800 or multiple processors 840 can be distributed over a wired or wireless network (e.g., a Wide Area Network, Local Area Network, or the Internet). The multiple computing devices 800 or multiple processors 840 can perform any of the steps of the present disclosure individually or in coordination with one another.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method for kernel prediction, the method comprising:
   receiving, from an image editing system, as input to a neural network, an image for denoising, the image comprising a plurality of pixels;
   estimating, by the neural network, coefficient vectors for respective pixels of the image;
   applying, by the neural network, the coefficient vectors to a kernel dictionary to generate denoising kernels, respectively, each denoising kernel being associated with a respective one of the plurality of pixels;
   generating, by the neural network, a denoised image, wherein generating the denoised image comprises applying each denoising kernel to a respective pixel of the image that is associated with the denoising kernel; and
   outputting, by the neural network, the denoised image.

2. The method for kernel prediction of claim 1, wherein the kernel dictionary comprises a plurality of base kernels, and each coefficient vector for each pixel comprises a vector of percentages, wherein generating a particular denoising kernel for a particular pixel comprises weighting each base kernel with a respective percentage from a particular coefficient vector and combining the weighted base kernels into the particular denoising kernel.

3. The method for kernel prediction of claim 1, wherein the kernel dictionary comprises a plurality of base kernels that are fixed values.

4. The method for kernel prediction of claim 1, further comprising:
   training the kernel dictionary and the neural network using a ground truth image.

5. The method for kernel prediction of claim 1, further comprising:
   generating the kernel dictionary by a kernel estimator layer of the neural network based on the image for denoising.

6. The method for kernel prediction of claim 5, wherein the kernel dictionary comprises a plurality of base kernels, and wherein generating the kernel dictionary comprises:
   receiving, at the kernel estimator layer, the image;
   analyzing, by the kernel estimator layer, the image; and
   generating, by the kernel estimator layer, the plurality of base kernels based on analyzing the image.

7. The method for kernel prediction of claim 1, further comprising:
   generating, by the image editing system, the image using Monte Carlo rendering.

8. A system, comprising:
   one or more processors; and a memory having stored thereon instructions that, when executed by the one or more processors, cause the one or more processors to:
  generate coefficient vectors for respective pixels of an image;
  apply the coefficient vectors to a kernel dictionary to generate denoising kernels, respectively, each denoising kernel being associated with a respective pixel of the image; and
  generate a denoised image by at least applying each denoising kernel to the respective pixel of the image that is associated with the denoising kernel.

9. The system of claim 8, wherein the kernel dictionary comprises a plurality of base kernels, and each coefficient vector for each pixel comprises a vector of percentages, wherein generating a particular denoising kernel for a particular pixel comprises weighting each base kernel with a respective percentage from a particular coefficient vector and combining the weighted base kernels into the particular denoising kernel.

10. The system of claim 8, wherein the kernel dictionary comprises a plurality of base kernels that are fixed values.

11. The system of claim 8, wherein the kernel dictionary is included in a neural network,
  wherein the instructions, when executed by the one or more processors, further cause the one or more processors to:
  train the kernel dictionary and the neural network using a ground truth image.

12. The system of claim 8, wherein the kernel dictionary is included in a neural network,
  wherein the instructions, when executed by the one or more processors, further cause the one or more processors to:
  generate the kernel dictionary by a kernel estimator layer of the neural network based on the image for denoising.

13. The system of claim 12, wherein the kernel dictionary comprises a plurality of base kernels, and wherein the instructions for generating the kernel dictionary comprise further instructions that, when executed by the one or more processors, cause the one or more processors to:
  receive the image;
  analyze the image; and
  generate the plurality of base kernels based on analyzing the image.

14. The system of claim 8, wherein the memory comprises further instructions that, when executed by the one or more processors, cause the one or more processors to:
  generate the image using Monte Carlo rendering.

15. A non-transitory computer-readable medium having stored thereon instructions that, when executed by one or more processors, cause the one or more processors to:
  receive an image for denoising, the image comprising a plurality of pixels;
  estimate coefficient vectors for respective pixels of the image;
  apply the coefficient vectors to a kernel dictionary to generate denoising kernels, respectively, each denoising kernel being associated with a respective one of the plurality of pixels;
  generate a denoised image, wherein generating the denoised image comprises applying each denoising kernel to a respective pixel of the image that is associated with the denoising kernel; and
  output the denoised image.

16. The non-transitory computer-readable medium of claim 15, wherein the kernel dictionary comprises a plurality of base kernels, and each coefficient vector for each pixel comprises a vector of percentages, wherein generating a particular denoising kernel for a particular pixel comprises weighting each base kernel with a respective percentage from a particular coefficient vector and combining the weighted base kernels into the particular denoising kernel.

17. The non-transitory computer-readable medium of claim 15, wherein the kernel dictionary comprises a plurality of base kernels that are fixed values.

18. The non-transitory computer-readable medium of claim 15, wherein the kernel dictionary is included in a neural network, wherein the instructions, when executed, further cause the one or more processors to:
  train the kernel dictionary and the neural network using a ground truth image.

19. The non-transitory computer-readable medium of claim 15, wherein the instructions, when executed, further cause the one or more processors to:
  generate the kernel dictionary by a kernel estimator layer of a neural network based on the image for denoising.

20. The non-transitory computer-readable medium of claim 19, wherein the kernel dictionary comprises a plurality of base kernels, and wherein the instructions for generating the kernel dictionary comprise further instructions that, when executed by the one or more processors, cause the one or more processors to:
  receive the image;
  analyze the image; and
  generate the plurality of base kernels based on analyzing the image.

* * * * *